(12) United States Patent
Chou

(10) Patent No.: US 9,442,727 B2
(45) Date of Patent: Sep. 13, 2016

(54) FILTERING OUT REDUNDANT SOFTWARE PREFETCH INSTRUCTIONS

(71) Applicant: Oracle International Corporation, Redwood City, CA (US)

(72) Inventor: Yuan C. Chou, Los Gatos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 387 days.

(21) Appl. No.: 14/053,378

(22) Filed: Oct. 14, 2013

(65) Prior Publication Data

US 2015/0106590 A1    Apr. 16, 2015

(51) Int. Cl.
*G06F 7/38* (2006.01)
*G06F 12/00* (2006.01)
*G06F 9/30* (2006.01)
*G06F 9/38* (2006.01)
*G06F 11/30* (2006.01)

(52) U.S. Cl.
CPC ....... *G06F 9/30072* (2013.01); *G06F 9/30047* (2013.01); *G06F 9/3832* (2013.01); *G06F 11/3037* (2013.01); *G06F 2201/865* (2013.01); *G06F 2201/88* (2013.01)

(58) Field of Classification Search
CPC ................. G06F 2212/6024; G06F 2212/6026
See application file for complete search history.

(56) References Cited

U.S. PATENT DOCUMENTS

| | | | |
|---|---|---|---|
| 2007/0239940 A1* | 10/2007 | Doshi | G06F 12/0862 711/137 |
| 2009/0240887 A1* | 9/2009 | Okawara | G06F 9/3455 711/118 |
| 2012/0096227 A1* | 4/2012 | Dubrovin | G06F 12/0862 711/137 |

\* cited by examiner

*Primary Examiner* — Hyun Nam
(74) *Attorney, Agent, or Firm* — Park, Vaughan, Fleming & Dowler LLP

(57) ABSTRACT

The disclosed embodiments relate to a system that selectively filters out redundant software prefetch instructions during execution of a program on a processor. During execution of the program, the system collects information associated with hit rates for individual software prefetch instructions as the individual software prefetch instructions are executed, wherein a software prefetch instruction is redundant if the software prefetch instruction accesses a cache line that has already been fetched from memory. As software prefetch instructions are encountered during execution of the program, the system selectively filters out individual software prefetch instructions that are likely to be redundant based on the collected information, so that likely redundant software prefetch instructions are not executed by the processor.

20 Claims, 4 Drawing Sheets

FILTERING OUT REDUNDANT SOFTWARE PREFETCH INSTRUCTIONS

BACKGROUND

1. Field

The disclosed embodiments generally relate to techniques for improving performance in computer systems. More specifically, the disclosed embodiments relate to the design of a processor, which includes a mechanism to filter out redundant software prefetch instructions, which access cache lines that have already fetched from memory.

2. Related Art

As the gap between processor speed and memory performance continues to grow, prefetching is becoming an increasingly important technique for improving computer system performance. Prefetching involves pulling cache lines from memory and placing them into a cache before the cache lines are actually accessed by an application. This prevents the application from having to wait for a cache line to be retrieved from memory and thereby improves computer system performance.

Computer systems generally make use of two types of prefetching, software-controlled prefetching (referred to as "software prefetching") and hardware-controlled prefetching (referred to as "hardware prefetching"). To support software prefetching, a compiler analyzes the data access patterns of an application at compile time and inserts software prefetch instructions into the executable code to prefetch cache lines before they are needed. In contrast, a hardware prefetcher operates by analyzing the actual data access patterns of an application at run time to predict which cache lines will be accessed in the near future, and then causes the processor to prefetch these cache lines.

Many software prefetch instructions are redundant because a processor's hardware prefetchers are often able to eliminate the same cache misses. Note that redundant prefetches can reduce processor performance because they consume processor resources, such as execution pipeline stages and load-store unit bandwidth, without performing useful work. However, blindly filtering out all software prefetches or disabling all hardware prefetchers both degrade performance because there are some cache misses that only the software prefetches are able to eliminate and others that only the hardware prefetchers are able to eliminate.

Hence, it is desirable to be able to selectively eliminate redundant software prefetches without eliminating valid software prefetches.

SUMMARY

The disclosed embodiments relate to a system that selectively filters out redundant software prefetch instructions during execution of a program on a processor. During execution of the program, the system collects information associated with hit rates for individual software prefetch instructions as the individual software prefetch instructions are executed, wherein a software prefetch instruction is redundant if the software prefetch instruction accesses a cache line that has already been fetched from memory. As software prefetch instructions are encountered during execution of the program, the system selectively filters out individual software prefetch instructions that are likely to be redundant based on the collected information. In this way, software prefetch instructions that are likely to be redundant are not executed by the processor.

In some embodiments, while selectively filtering out individual software prefetch instructions, the system enables filtering operations when a utilization rate of a load-store unit in the processor exceeds a threshold.

In some embodiments, the system periodically determines the utilization rate for the load-store unit by determining how many loads, stores and prefetches are processed by the processor within a given time interval.

In some embodiments, while collecting the information associated with hit rates, the system uses one or more counters associated with each software prefetch instruction to keep track of cache hits and cache misses for the software prefetch instruction.

In some embodiments, upon decoding the software prefetch instruction at a decode unit in the processor, the system performs a lookup for the software prefetch instruction in a filter table, wherein the filter table includes entries for software prefetch instructions that are to be filtered out. If the lookup finds an entry for the software prefetch instruction, the system filters out the software prefetch instruction so that the software prefetch instruction is not executed. If the lookup does not find an entry for the software prefetch instruction, the system allows the software prefetch instruction to execute.

In some embodiments, upon encountering a software prefetch instruction at a load-store unit in the processor, the system performs a lookup for the software prefetch instruction in a learning table, wherein the learning table includes entries for software prefetch instructions that are executed by the program. If an entry does not exist for the software prefetch instruction in the learning table, the system allocates and initializes an entry for the software prefetch instruction in the learning table. The system also determines whether executing the software prefetch instruction causes a cache hit or a cache miss. Next, the system updates information in the entry for the software prefetch instruction based on the determination. If the updated information indicates that the software prefetch instruction is likely to be redundant, the system creates an entry in the filter table for the software prefetch instruction, if an entry does not already exist. On the other hand, if the updated information indicates that the software prefetch instruction is unlikely to be redundant, the system invalidates an entry in the filter table for the software prefetch instruction if such an entry exists.

In some embodiments, while selectively filtering out the individual software prefetch instructions, the system adjusts a hit-rate threshold for the filtering technique based on a utilization rate for the load-store unit, wherein the hit-rate threshold becomes higher as the utilization rate of the load-store unit increases, and becomes lower as the utilization rate of the load-store unit decreases.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

As mentioned above, the disclosed embodiments relate to a technique for selectively filtering out individual software prefetch instructions that are likely to be redundant based on the collected information, so that likely redundant software prefetch instructions are not executed by the processor.

Before we describe how this technique operates, we first describe the structure of a processor that implements this technique.

Computer System

Figure 1A:
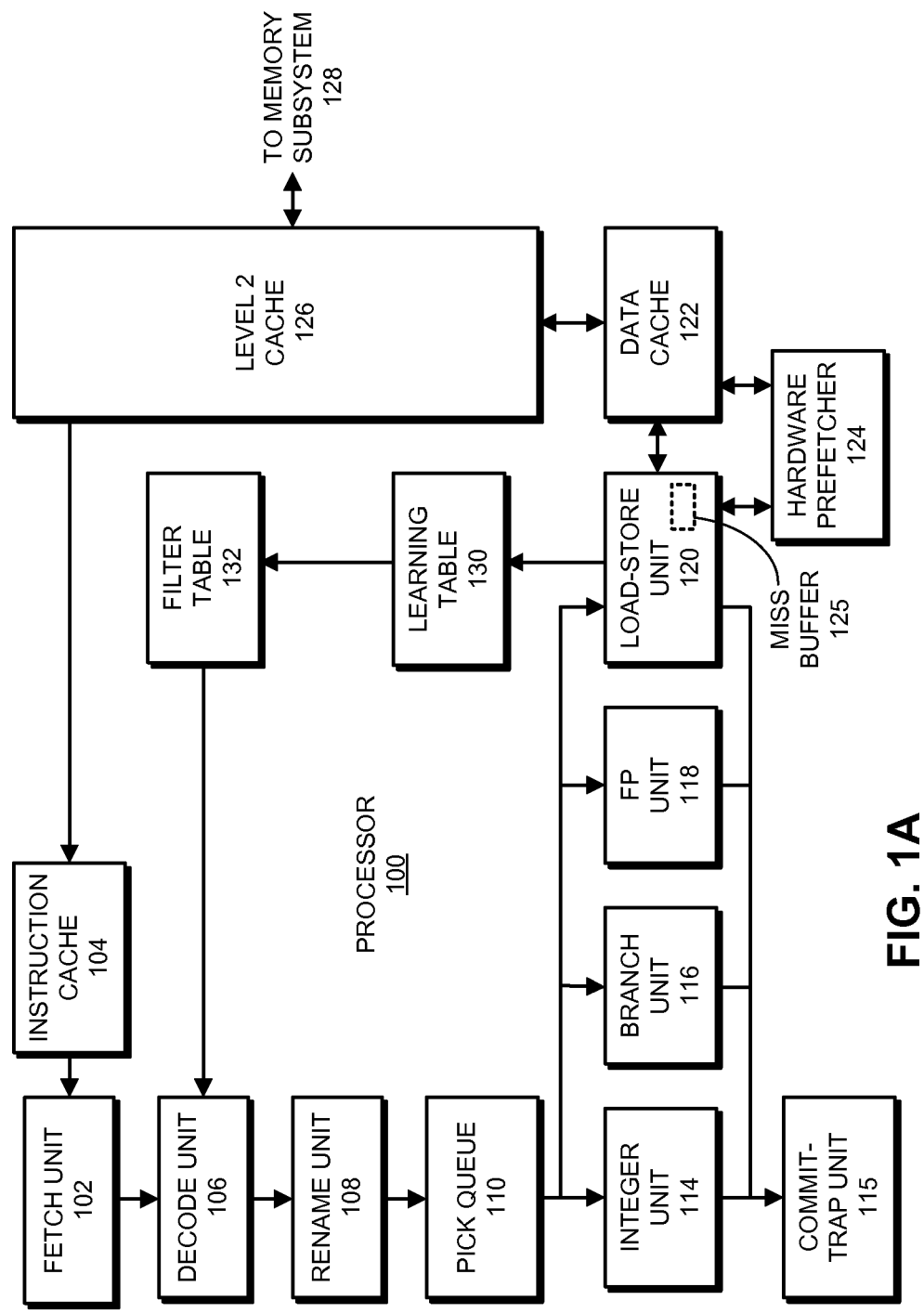
FIG. 1A illustrates a processor in accordance with disclosed embodiments.

FIG. 1A illustrates an exemplary processor 100 in accordance with disclosed embodiments. Processor 100 can include any type of computing engine that can make use of prefetching instructions, including a processor in: a server computer system, a desktop computer system, a laptop computer system, a tablet computer system, a smartphone or a device controller.

Processor 100 includes a number of components which are illustrated in FIG. 1A. On the right side of FIG. 1A, a memory subsystem 128 is coupled to a level 2 (L2) cache 126. Note that memory subsystem 128 can include a level 3 (L3) cache and a main memory. L2 cache 126 is coupled to both an instruction cache 104 and a data cache 122. During operation of processor 100, an instruction is retrieved from instruction cache 104 by instruction fetch unit 102. This instruction feeds into a decode unit 106 and then into a register renaming unit 108. Next, the instruction feeds into pick queue 110 where it waits to receive operands so it is ready to execute and is then sent to a functional unit for execution. These functional units include integer unit 114, branch unit 116, floating-point (FP) unit 118 and load-store unit 120. Note that load-store unit 120 moves operands between a register file and data cache 122. Load-sore unit 120 is also coupled to a hardware prefetcher 124, which dynamically monitors data accesses and then selectively prefetches cache lines based on detected data access patterns. Finally, after the instruction passes through one of the functional units, the instruction passes through commit-trap unit 115, which commits the result of the instruction to the architectural state of the processor.

Processor 100 also includes two hardware structures that are used to facilitate selectively filtering software prefetch instructions, including learning table 130 and filter table 132.

Learning Table

Figure 1B:
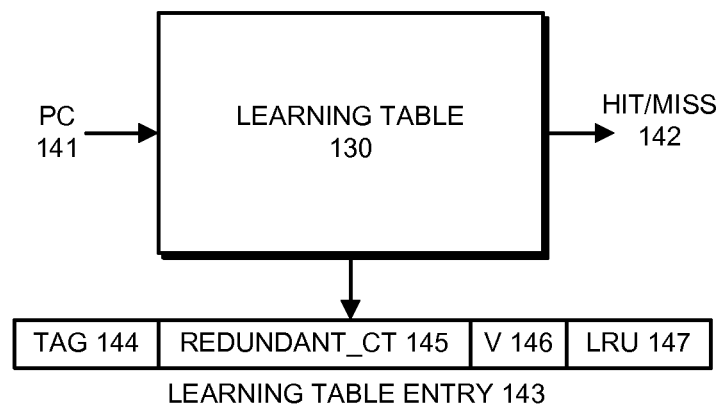
FIG. 1B illustrates the structure of a learning table in accordance with disclosed embodiments.

Referring to FIG. 1B, learning table 130 is a lookup structure that contains entries for specific software prefetch instructions, and which can be implemented similarly to a cache memory. More specifically, learning table 130 is accessed by performing a lookup using a program counter (PC) 141 for a software prefetch instruction. If learning table 130 contains an entry for the software prefetch instruction, hit/miss signal 142 indicates if the access is a "hit." As illustrated in FIG. 1B, an exemplary learning table entry 143 includes: a tag field 144 that contains the PC of the software prefetch instruction; a redundant counter (REDUNDANT_CT) 145, which is used to track cache hits and cache misses for the software prefetch instruction; a valid flag 146 that indicates whether the entry is valid, and least-recently used (LRU) information 147, which is used to facilitate a least-recently used replacement policy for entries in learning table 130.

Filter Table

Figure 1C:
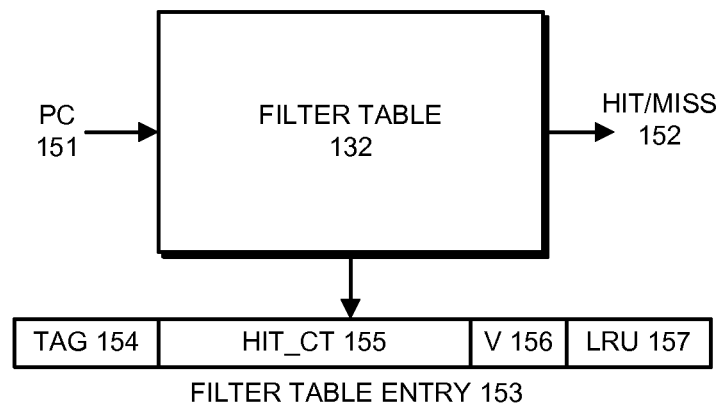
FIG. 1C illustrates the structure of a filter table in accordance with disclosed embodiments.

Referring to FIG. 1C, filter table 132 is a lookup structure that contains entries for specific software prefetch instructions, and which can also be implemented similarly to a cache memory. More specifically, filter table 132 is accessed by performing a lookup using a program counter (PC) 151 for a software prefetch instruction. If filter table 132 contains an entry for the software prefetch instruction, hit/miss signal 152 indicates if the access is a "hit." As illustrated in FIG. 1C, an exemplary filter table entry 153 includes: a tag field 154 that contains the PC of the software prefetch instruction; a hit counter (HIT_CT) 155, which is used to keep track of filter table hits for the software prefetch instruction; a valid flag 156 that indicates whether the entry is valid, and least-recently used (LRU) information 157, which is used to facilitate a least-recently used replacement policy for entries in filter table 132.

Updating Learning Table and Filter Table Based on Cache Hits/Misses

Figure 2:
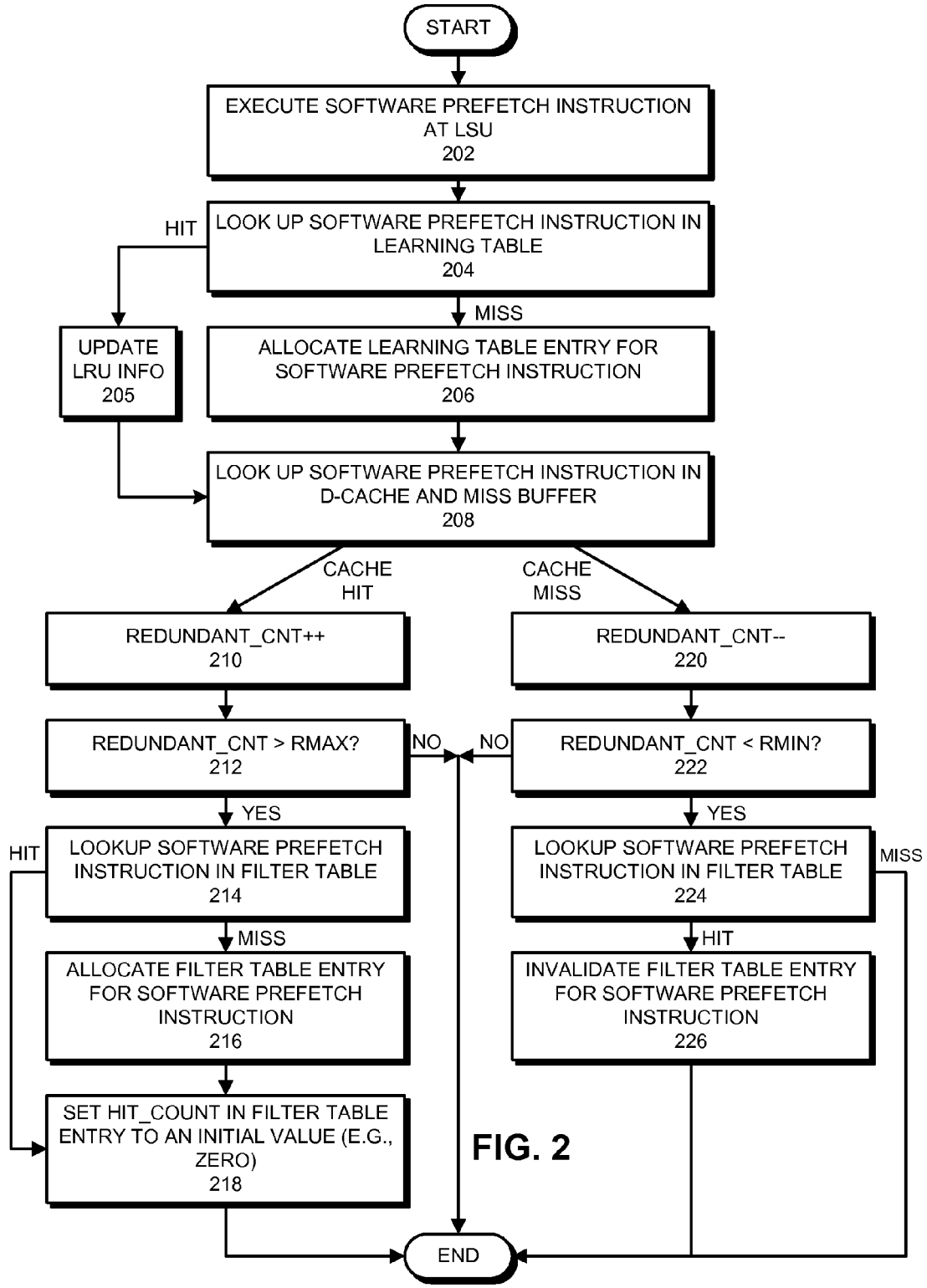
FIG. 2 presents a flow chart illustrating how learning table 130 and filter table 132 are updated based on cache hits and/or misses for a software prefetch instruction in accordance with the disclosed embodiments.

FIG. 2 presents a flow chart illustrating how learning table 130 and filter table 132 are updated based on cache hits and/or cache misses for a software prefetch instruction in accordance with the disclosed embodiments.

When a software prefetch instruction is executed at load-store unit 120 in FIG. 1 (step 202), the system updates learning table 130 as follows. First, the system looks up the prefetch instruction based on its PC in learning table 130

(step 204). If an entry for the software prefetch instruction is found during this lookup, the system updates the entry's associated LRU information 147 (step 205). If no entry for the prefetch instruction is found in learning table 130, the system allocates an entry 143 for the prefetch instruction (step 206). The system additionally initializes the entry's REDUNDANT_CT 145 to an initial value R_INIT_VAL, and also initializes its LRU information 147.

After step 205 or step 206, the system performs a lookup for the prefetch instruction in data cache 122 (step 208). This lookup either causes a cache hit or a cache miss. If the lookup causes a cache hit (or hits in the load miss buffer 125), the system increments REDUNDANT_CT (step 210). The system then determines whether REDUNDANT_CT exceeds a maximum value RMAX (step 212). If not, the process is complete. Otherwise, if REDUNDANT_CT>RMAX, the system takes this as an indication that software prefetch instructions located at the same PC are likely to be redundant. In this case, the system performs a lookup for the software prefetch instruction in filter table 132 (step 214). If the lookup generates a filter table miss, the system allocates a filter table entry 153 for the software prefetch instruction (step 216). If the lookup generates a filter table hit at step 214 or after step 216, the system sets the hit count HIT_CT 155 for the filter table entry 153 to an initial value H_INIT_VAL (which, for example, can be zero) (step 218). At this point, the process is complete.

If the lookup in step 208 causes a cache miss, the system decrements REDUNDANT_CT (step 220). The system then determines whether REDUNDANT_CT falls below a minimum value RMIN (step 222). If not, the process is complete. Otherwise, if REDUNDANT_CT<RMIN, the system takes this as an indication that prefetch instructions from the same PC are not likely to be redundant. In this case, the system performs a lookup for the software prefetch instruction in filter table 132 (step 224). If the lookup in filter table 132 causes a filter table miss, the process is complete. Otherwise, if the lookup in filter table 132 causes a filter table hit, the system invalidates the filter table entry (step 226). At this point, the process is complete.

Filtering Software Prefetch Instructions

Figure 3:
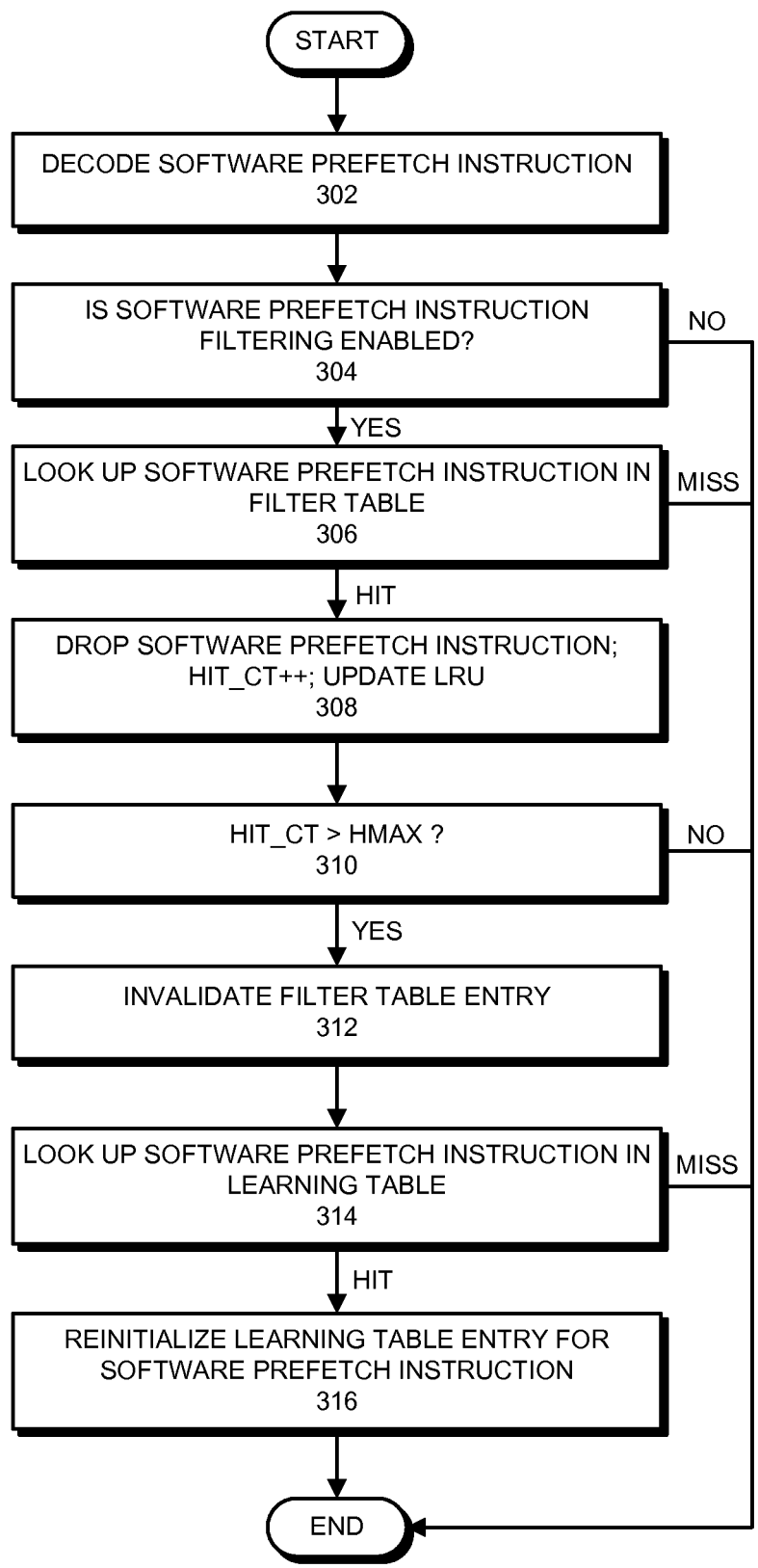
FIG. 3 presents a flow chart illustrating how software prefetch instructions are filtered out in accordance with the disclosed embodiments.

FIG. 3 presents a flow chart illustrating how software prefetch instructions are filtered out in accordance with the disclosed embodiments. This process can take place when a software prefetch instruction is decoded at decode unit 106 in processor 100's execution pipeline (step 302). The system first determines whether software prefetch instruction filtering is enabled (step 304). In some embodiments, the system makes this determination based on a utilization rate for the load-store unit. This can be accomplished by counting how many loads, stores and software prefetches are decoded by the processor within a given time interval. If this count exceeds a pre-defined threshold, the utilization rate is deemed to indicate that the load-store unit is saturated and software prefetch filtering is enabled for the next time interval. If software prefetch instruction filtering is not enabled at step 304, the process is complete.

On the other hand, if software prefetch instruction filtering is enabled at step 304, the system looks up the software prefetch instruction in filter table 132 (step 306). If this lookup generates a filter table miss, the software prefetch instruction is not subject to filtering and the process is complete. Otherwise, if the filter table lookup generates a hit, this indicates that the software prefetch instruction is subject to filtering. In this case, the system drops the software prefetch instruction at decode unit 106, increments the HIT_CT 155 in the corresponding entry in filter table 132 and updates LRU information 157 (step 308). Note that dropping the software prefetch instruction conserves processor resources, such as pick queue entries, reorder buffer entries, and load-store unit bandwidth.

Next, the system determines whether HIT_CT exceeds a maximum value HMAX (step 310). If not, the process is complete. Otherwise, if HIT_CT>HMAX, the system invalidates the corresponding filter table entry 153 (step 312). The system also performs a lookup for the software prefetch instruction in learning table 130 (step 314). If the learning table lookup causes a miss, the process is complete. Otherwise, if the learning table lookup causes a hit, the system reinitializes the REDUNDANT_CT in the learning table entry, which involves setting REDUNDANT_CT to R_INIT_VAL (step 316). By invalidating the filter table entry periodically in this manner, the system enables re-learning to take place. This prevents a software prefetch instruction from being continually filtered even though its most recent instances are actually not redundant.

Note that the values of R_INIT_VAL, RMAX, R_MIN, H_INIT_VAL and HMAX may either be hardwired constants or can be programmed by firmware.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for selectively filtering out redundant software prefetch instructions during execution of a program on a processor, comprising:
  during execution of the program,
    collecting information associated with hit rates for individual software prefetch instructions as the individual software prefetch instructions are executed, wherein a software prefetch instruction is determined to be redundant upon determining that the software prefetch instruction accesses a cache line that has already been fetched from memory, wherein determining that the software prefetch instruction is redundant comprises determining that a redundant count associated with an entry for the software prefetch instruction in a learning table exceeds a pre-determined threshold; and
    as software prefetch instructions are encountered during execution of the program, selectively filtering out individual software prefetch instructions that are likely to be redundant based on the collected information, so that likely redundant software prefetch instructions are not executed by the processor.

2. The method of claim 1, wherein selectively filtering out individual software prefetch instructions includes enabling filtering operations when a utilization rate of a load-store unit in the processor exceeds a threshold.

3. The method of claim 2, wherein the method further comprises periodically determining the utilization rate for the load-store unit by determining how many loads, stores and software prefetch instructions are processed in a given time interval.

4. The method of claim 1, wherein collecting the information associated with hit rates includes using one or more counters associated with each software prefetch instruction to keep track of cache hits and/or cache misses for the software prefetch instruction.

5. The method of claim 1, wherein selectively filtering out a software prefetch instruction includes:
   upon decoding the software prefetch instruction at a decode unit in the processor, performing a lookup for the software prefetch instruction in a filter table, wherein the filter table includes entries for software prefetch instructions that are to be filtered out;
   if the lookup finds an entry for the software prefetch instruction, filtering out the software prefetch instruction so that the software prefetch instruction is not executed; and
   if the lookup does not find an entry for the software prefetch instruction, allowing the software prefetch instruction to execute.

6. The method of claim 5, wherein collecting the information associated with hit rates for a software prefetch instruction includes:
   performing a lookup for the software prefetch instruction in a learning table, wherein the learning table includes entries for software prefetch instructions that are executed by the program;
   if an entry does not exist for the software prefetch instruction in the learning table, allocating and initializing an entry for the software prefetch instruction in the learning table;
   determining whether executing the software prefetch instruction causes a cache hit or a cache miss;
   updating information in the entry for the software prefetch instruction based on the determination;
   if the updated information indicates the software prefetch instruction is likely to be redundant, creating an entry in the filter table for the software prefetch instruction if an entry does not already exist; and
   if the updated information indicates the software prefetch instruction is unlikely to be redundant, invalidating an entry in the filter table for the software prefetch instruction if such an entry exists.

7. The method of claim 1, wherein selectively filtering out the individual software prefetch instructions includes adjusting an aggressiveness of the filtering technique based on a utilization rate for the load-store unit, wherein the filtering technique becomes more aggressive as the utilization rate of the load-store unit increases, and becomes less aggressive as the utilization rate of the load-store unit decreases.

8. A processor that selectively filters out redundant software prefetch instructions during execution of a program, comprising:
   an instruction cache;
   a data cache; and
   an execution mechanism including an execution pipeline, wherein during execution of the program, the execution mechanism is configured to,
      collect information associated with hit rates for individual software prefetch instructions as the individual software prefetch instructions are executed, wherein a software prefetch instruction is determined to be redundant upon determining that the software prefetch instruction accesses a cache line that has already been fetched from memory, wherein determining that the software prefetch instruction is redundant comprises determining that a redundant count associated with an entry for the software prefetch instruction in a learning table exceeds a pre-determined threshold; and
      as software prefetch instructions are encountered during execution of the program, selectively filter out individual software prefetch instructions that are likely to be redundant based on the collected information, so that likely redundant software prefetch instructions are not executed by the processor.

9. The processor of claim 8, wherein while selectively filtering out individual software prefetch instructions, the execution mechanism is configured to enable filtering operations when a utilization rate of a load-store unit in the processor exceeds a threshold.

10. The processor of claim 9, wherein the execution mechanism is configured to periodically determine the utilization rate for the load-store unit by determining how many loads, stores and software prefetch instructions are processed in a given time interval.

11. The processor of claim 8, wherein while collecting the information associated with hit rates, the execution mechanism is configured to use one or more counters associated with each software prefetch instruction to keep track of cache hits and/or cache misses for the software prefetch instruction.

12. The processor of claim 8,
   wherein the execution mechanism includes a filter table, which includes entries for software prefetch instructions that are to be filtered out;
   wherein upon decoding a software prefetch instruction at a decode unit in the processor, the execution mechanism is configured to perform a lookup for the software prefetch instruction in the filter table;
   wherein if the lookup finds an entry for the software prefetch instruction, the execution mechanism is configured to filter out the software prefetch instruction so that the software prefetch instruction is not executed; and
   wherein if the lookup does not find an entry for the software prefetch instruction, the execution mechanism is configured to allow the software prefetch instruction to execute.

13. The processor of claim 12,
   wherein the execution mechanism includes a learning table, which includes entries for software prefetch instructions that are executed by the program;
   wherein while collecting the information associated with hit rates for a software prefetch instruction, the execution mechanism is configured to,
      perform a lookup for the software prefetch instruction in the learning table,
      if an entry does not exist for the software prefetch instruction in the learning table, allocate and initialize an entry for the software prefetch instruction in the learning table;
      determine whether executing the software prefetch instruction causes a cache hit or a cache miss;
      update information in the entry for the software prefetch instruction based on the determination;
      if the updated information indicates the software prefetch instruction is likely to be redundant, create an entry in the filter table for the software prefetch instruction if an entry does not already exist; and
      if the updated information indicates the software prefetch instruction is unlikely to be redundant, invalidate an entry in the filter table for the software prefetch instruction if such an entry exists.

14. The processor of claim 8, wherein while selectively filtering out the individual software prefetch instructions, the execution mechanism is configured to adjust an aggressiveness of the filtering technique based on a utilization rate for the load-store unit, wherein the filtering technique becomes more aggressive as the utilization rate of the load-store unit increases and becomes less aggressive as the utilization rate of the load-store unit decreases.

15. A computer system that selectively filters out redundant software prefetch instructions during execution of a program, comprising:
a processor;
a memory;
an instruction cache within the processor;
a data cache within the processor; and
an execution mechanism including an execution pipeline within the processor, wherein during execution of the program, the execution mechanism is configured to,
  collect information associated with hit rates for individual software prefetch instructions as the individual software prefetch instructions are executed, wherein a software prefetch instruction is determined to be redundant upon determining that the software prefetch instruction accesses a cache line that has already been fetched from memory, wherein determining that the software prefetch instruction is redundant comprises determining that a redundant count associated with an entry for the software prefetch instruction in a learning table exceeds a pre-determined threshold; and
  as software prefetch instructions are encountered during execution of the program, selectively filter out individual software prefetch instructions that are likely to be redundant based on the collected information, so that likely redundant software prefetch instructions are not executed by the processor.

16. The computer system of claim 15, wherein while selectively filtering out individual software prefetch instructions, the execution mechanism is configured to enable filtering operations when a utilization rate of a load-store unit in the processor exceeds a threshold.

17. The computer system of claim 16, wherein the execution mechanism is configured to periodically determine the utilization rate for the load-store unit by determining how many loads, stores and software prefetch instructions are processed in a given time interval.

18. The computer system of claim 15, wherein while collecting the information associated with hit rates, the execution mechanism is configured to use one or more counters associated with each software prefetch instruction to keep track of cache hits and/or cache misses for the software prefetch instruction.

19. The computer system of claim 15,
wherein the execution mechanism includes a filter table, which includes entries for software prefetch instructions that are to be filtered out;
wherein upon decoding a software prefetch instruction at a decode unit in the processor, the execution mechanism is configured to perform a lookup for the software prefetch instruction in the filter table;
wherein if the lookup finds an entry for the software prefetch instruction, the execution mechanism is configured to filter out the software prefetch instruction so that the software prefetch instruction is not executed; and
wherein if the lookup does not find an entry for the software prefetch instruction, the execution mechanism is configured to allow the software prefetch instruction to execute.

20. The computer system of claim 19,
wherein the execution mechanism includes a learning table, which includes entries for software prefetch instructions that are executed by the program;
wherein while collecting the information associated with hit rates for a software prefetch instruction, the execution mechanism is configured to,
  perform a lookup for the software prefetch instruction in the learning table,
  if an entry does not exist for the software prefetch instruction in the learning table, allocate and initialize an entry for the software prefetch instruction in the learning table;
  determine whether executing the software prefetch instruction causes a cache hit or a cache miss;
  update information in the entry for the software prefetch instruction based on the determination;
  if the updated information indicates the software prefetch instruction is likely to be redundant, create an entry in the filter table for the software prefetch instruction if an entry does not already exist; and
  if the updated information indicates the software prefetch instruction is unlikely to be redundant, invalidate an entry in the filter table for the software prefetch instruction if such an entry exists.

* * * * *